(12) United States Patent
Buell et al.

(10) Patent No.: US 6,580,222 B2
(45) Date of Patent: Jun. 17, 2003

(54) INVERTER FOR DRIVING EL LAMP AND LIGHT EMITTING DIODES

(75) Inventors: Brian Jeffrey Buell, Gilbert, AZ (US); Robert Allen Kimball, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 11 days.

(21) Appl. No.: 09/790,007

(22) Filed: Feb. 20, 2001

(65) Prior Publication Data

US 2002/0113558 A1 Aug. 22, 2002

(51) Int. Cl.$^7$ .................................................. G09F 9/00
(52) U.S. Cl. ........................ 315/169.3; 315/224; 363/98
(58) Field of Search ............................. 315/169.3, 224, 315/242, 244; 363/98

(56) References Cited

U.S. PATENT DOCUMENTS

| 4,529,322 A | 7/1985 | Ueda | 368/255 |
|---|---|---|---|
| 4,982,141 A | 1/1991 | Pace et al. | 315/169.3 |
| 5,323,305 A | 6/1994 | Ikeda et al. | 363/98 |
| 5,617,015 A | 4/1997 | Goder et al. | 323/282 |
| 6,075,295 A | 6/2000 | Li | 307/39 |

FOREIGN PATENT DOCUMENTS

WO    WO 98/30070    7/1998

OTHER PUBLICATIONS

"Single Inductor Multiple Output Switching Converter . . .", *IEEE Journal of Solid–State Circuits*, vol. 38, No. 1, Jan. 2003, pp. 89–100.

*Primary Examiner*—David Hung Vu
(74) *Attorney, Agent, or Firm*—Paul F. Wille

(57) ABSTRACT

An inverter for driving an EL lamp is tapped to provide voltage or current for driving one or more EL lamps, LEDs, and an LCD. In accordance with one aspect of the invention, one side of the pump inductor is tapped for a voltage that drives one or more LEDs and the LCD. In accordance with another aspect of the invention, the LEDs are in series with a storage capacitor and are driven by the current pulses to the storage capacitor.

10 Claims, 4 Drawing Sheets

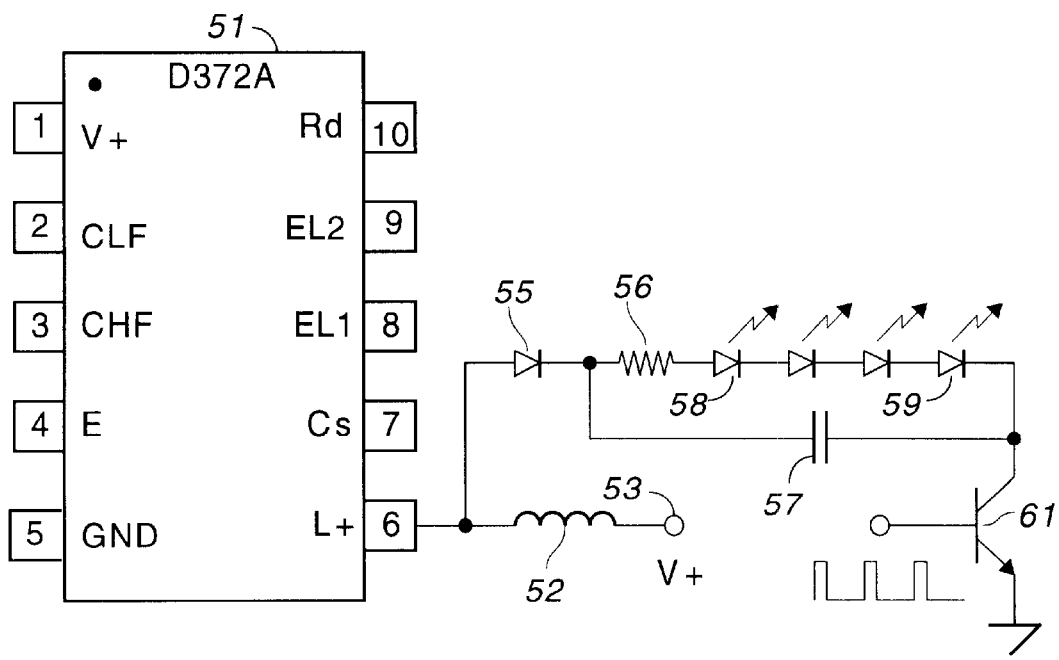
F I G. 4

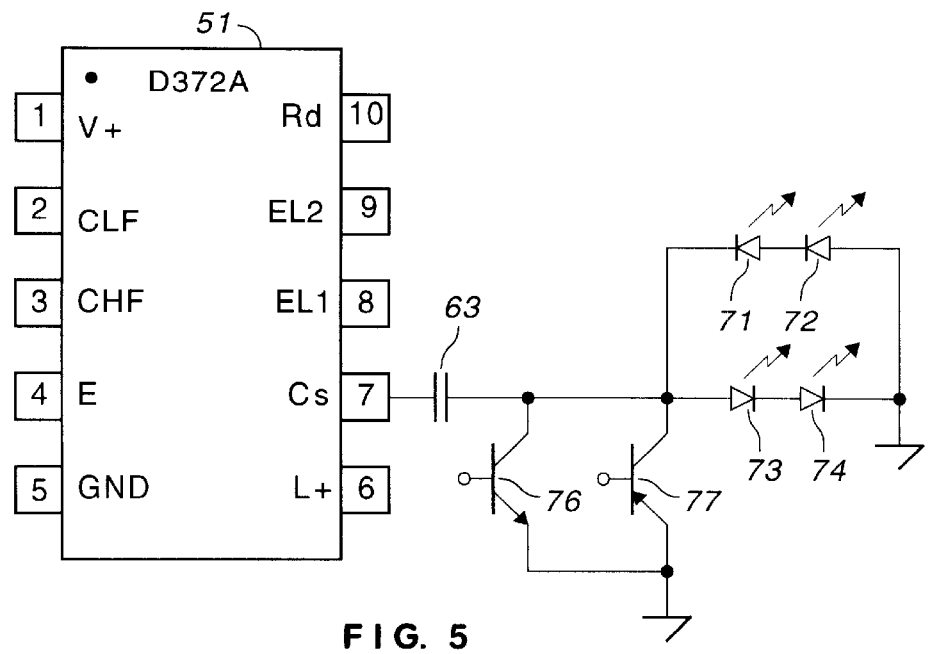
F I G. 5
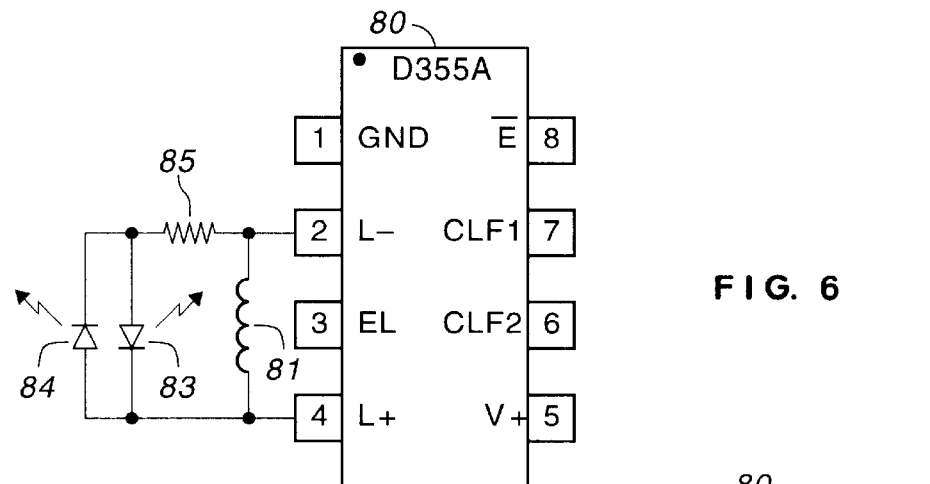
F I G. 6
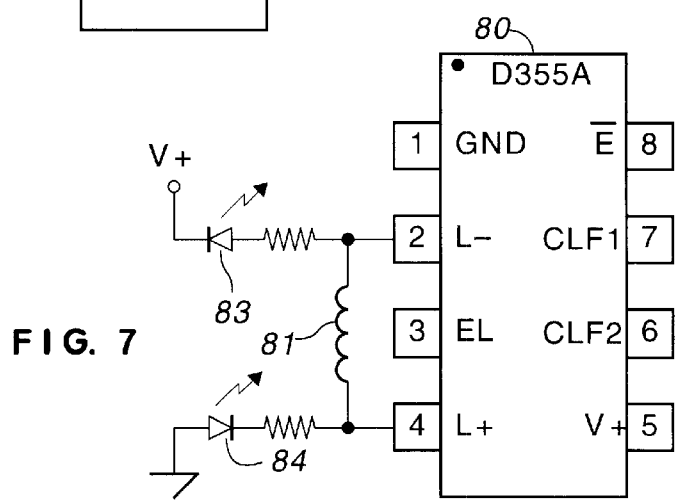
F I G. 7

INVERTER FOR DRIVING EL LAMP AND LIGHT EMITTING DIODES

BACKGROUND OF THE INVENTION

This invention relates to battery operated inverters and, in particular, to an inverter for driving an EL panel having one or more EL lamps, one or more light emitting diodes (LEDs), and providing a bias voltage for a liquid crystal display.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of inverters in which the energy stored in an inductor is supplied to an EL lamp as a small current at high voltage as the inductor is discharged either through the lamp or into a storage capacitor. The voltage on a storage capacitor is pumped up by a series of high frequency pulses from the inverter. The direct current produced by inverter must be converted into an alternating current in order to power an EL lamp. U.S. Pat. No. 4,527,096 (Kindlmann) discloses a switching bridge for this purpose. The bridge acts as a double pole double throw switch to alternate current through the EL lamp at low frequency. U.S. Pat. No. 5,313,141 (Kimball) discloses an inverter that produces AC voltage directly. A plurality of inverters are commercially available using either technology.

Many portable electronic devices, such as personal digital assistants and cellular telephones, use LEDs for illuminating a liquid crystal display (LCD) and an EL lamp for illuminating a keypad. The LEDs are typically powered by a driver, the liquid crystal display has its own driver, and the EL lamps are powered by an inverter. A driver is required for the LEDs because portable electronic devices use a 1.5–3 volt battery and LEDs have a minimum forward voltage drop of 1.8 volts. If LEDs are connected in series to minimize current, then the voltage requirement increases accordingly. If the LED is switched by a transistor, then the forward voltage drop of the transistor further increases the required supply voltage. In addition, LEDs require a ballast or current limiting device, such as a resistor or inductor, which dissipates power. Inductors are more efficient than resistors but are relatively expensive components and it is desired to minimize the number of inductors required by a circuit. The liquid crystal display requires bias voltages.

It would provide a significant cost savings if LEDs, LCDs, and EL lamps could be driven from the same driver. The problem is that EL lamps need 100 volts or more AC, LEDs need from 5–12 volts DC, and LCDs typically need a bias of 5–30 volts.

In view of the foregoing, it is therefore an object of the invention to provide an inverter for providing plural voltages for a personal electronic device.

Another object of the invention is to provide an inverter for driving LEDs, LCDs, and EL lamps by adapting an existing, commercially available inverter.

A further object of the invention is to provide an inverter for driving LEDs, LCDs, and EL lamps by modification to either type of existing inverter for EL lamps.

SUMMARY OF THE INVENTION

The foregoing objects are achieved in this invention in which an inverter for producing plural voltages is tapped to provide voltage or current for driving one or more EL lamps, LEDs, and an LCD. In accordance with one aspect of the invention, one side of a pump inductor is tapped for a voltage that drives one or more LEDs and the LCD. In accordance with another aspect of the invention, the LEDs are in series with the pump storage capacitor and are driven by the current to the storage capacitor.

BRIEF DESCRIPTION OF THE DRAWINGS

A more complete understanding of the invention can be obtained by considering the following detailed description in conjunction with the accompanying drawings, in which:

FIG. 4 is a schematic of an LED/EL driver constructed in accordance with a first aspect of the invention;

FIG. 5 is a schematic of an LED/EL driver constructed in accordance with a second aspect of the invention;

FIG. 6 is a schematic of an LED/EL driver constructed in accordance with an alternative embodiment of the invention;

FIG. 7 is a schematic of an LED/EL driver constructed in accordance with an alternative embodiment of the invention;

DETAILED DESCRIPTION OF THE INVENTION

Figure 1:
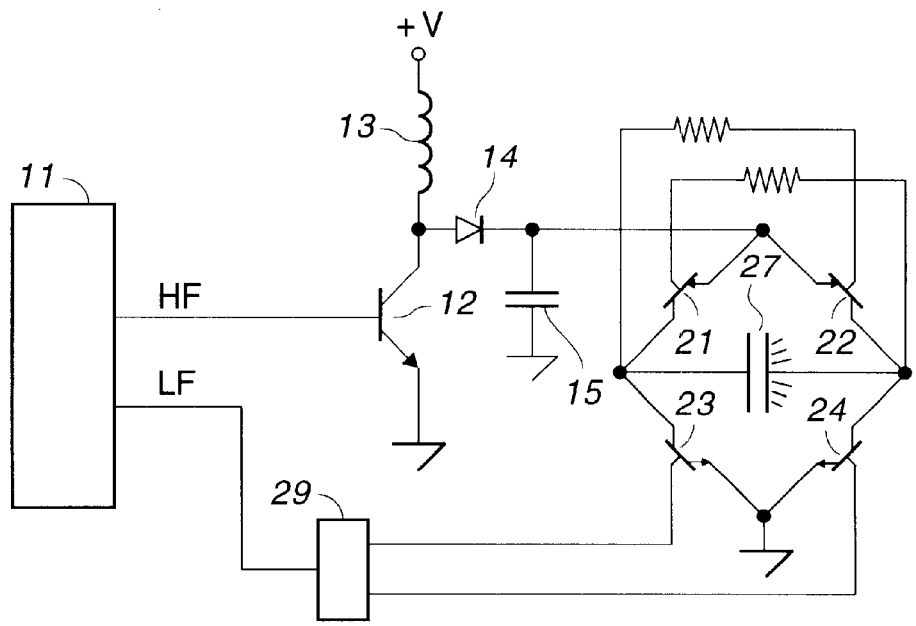
FIG. 1 is a schematic based upon U.S. Pat. No. 4,527,096.

In FIG. 1, pulse generator 11 provides high frequency pulses to transistor 12, which is coupled in series with inductor 13 between supply and common. The pulses are coupled through diode 14 to storage capacitor 15, which is coupled across the DC diagonal of a switching bridge including transistors 21, 22, 23, and 24. Diode 14 prevents storage capacitor 15 from discharging through transistor 12. EL lamp 27 is coupled across the AC diagonal of the switching bridge. Because neither end of EL lamp 27 is continuously grounded, the configuration illustrated in FIG. 1 is sometimes referred to as a floating lamp configuration. A low frequency signal is coupled to transistors 23 and 24 through flip-flop 29, which causes opposite legs of the bridge to conduct alternately, thereby producing an alternating current through lamp 27. The apparatus of FIG. 1 is known in the art, e.g. U.S. Pat. No. 4,527,096 (Kindlmann).

Figure 2:
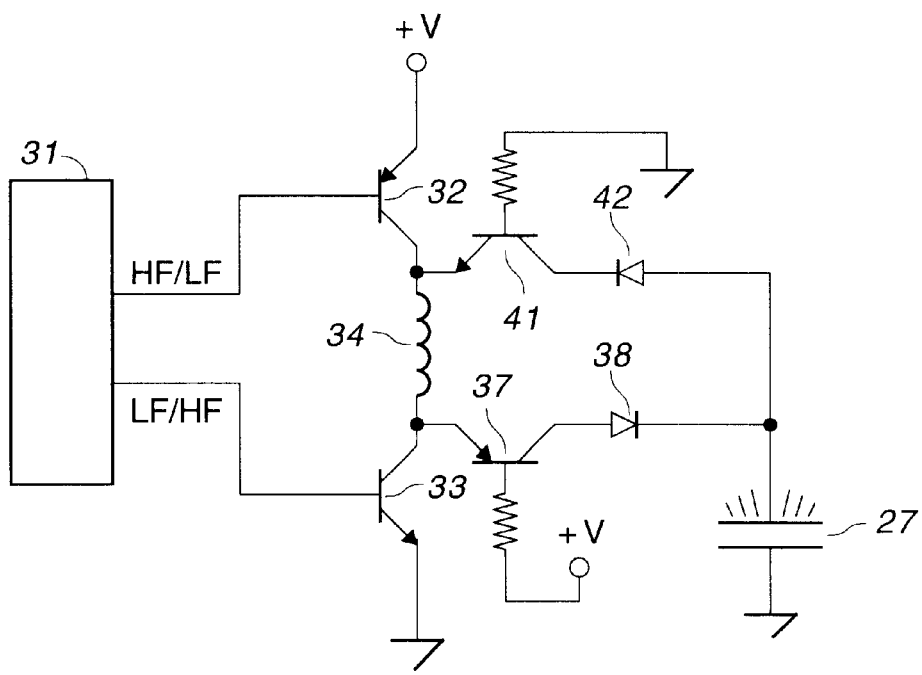
FIG. 2 is a schematic based upon U.S. Pat. No. 5,313,141.

In FIG. 2, pulse generator 31 provides low frequency pulses to one of transistors 32 and 33 and low frequency pulses to the other of the transistors. Inductor 34 is coupled in series between transistors 32 and 33. While transistor 32 is conducting, high frequency pulses coupled to the base of transistor 33 cause inductor 34 to produce a series of high frequency, high voltage, positive pulses that are coupled through transistor 37 and diode 38 to EL lamp 27. After a predetermined period, or after a predetermined number of high frequency pulses, the signals to transistors 32 and 33 are reversed. While transistor 33 is conducting, high frequency pulses coupled to the base of transistor 32 cause inductor 34 to produce a series of high frequency, high voltage, negative pulses that are coupled through transistor 41 and diode 42 to EL lamp 27. The process repeats, producing a low frequency alternating current through EL lamp 27. The apparatus of FIG. 2 is known in the art, e.g. U.S. Pat. No. 5,313,141 (Kimball). Because neither end of inductor 34 is continuously grounded, the configuration illustrated in FIG. 2 is sometimes referred to as a floating inductor configuration.

Figure 3:
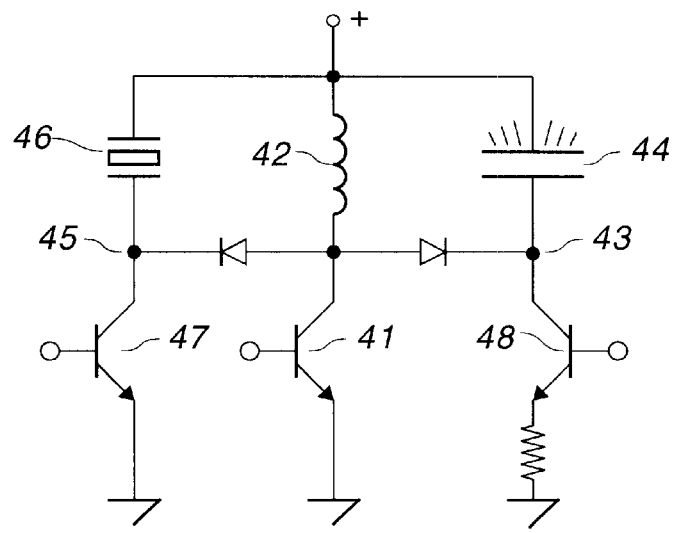
FIG. 3 is a schematic based upon U.S. Pat. No. 4,529,322.

FIG. 3 is the schematic of an inverter for driving two capacitive loads as disclosed as prior art in U.S. Pat. No. 4,529,322 (Ueda). In this inverter, transistor 41 is switched on and off at about eight kilohertz. When transistor 41 turns on, current flows through inductor 42, storing energy in the magnetic field generated by the inductor. When transistor 41 shuts off, the magnetic field collapses at a rate determined by the turn-off characteristics of the transistor. The voltage across inductor 42 is proportional to the rate at which the field collapses. A large positive voltage is developed at node 43, charging EL lamp 44 above supply voltage, and at node 45, charging piezoelectric buzzer 46 above supply voltage. Transistors 41, 47 and 48 are active in different combinations to operate either buzzer 46 or EL lamp 44.

In FIG. 4, a commercially available inverter is modified in accordance with the invention. Inverter 51 is known as a type D372A, available from Durel Corporation, Chandler, Ariz. The inverter includes an inductive boost circuit and an H-bridge output; i.e. an EL lamp (not shown) is coupled across the AC diagonal (pins 8 and 9) of a switching bridge within the inverter. Inductor 52 is part of the inductive boost circuit and has one end coupled to supply 53 and an output end coupled to pin 6 of inverter 51.

In accordance with the invention, a voltage supply for one or more LEDs is also coupled to the output end of inductor 52. The voltage supply includes diode 55, resistor 56, and capacitor 57. One or more LEDs, such as LEDs 58 and 59, are connected in series with resistor 56 between diode 55 and the collector-emitter path of transistor 61. Capacitor 57 is also coupled between diode 55 and transistor 61.

In operation, inverter 51 pulses inductor 52 at a high frequency to power an EL lamp (not shown) coupled to pins 8 and 9. When transistor 61 is conducting, some current is diverted through diode 55 to capacitor 57 and the LEDs. A pulsed signal is applied to the base of transistor 61 to turn the transistor on. The width of the pulse can be varied to vary the brightness of the LEDs and the EL lamp.

In one embodiment of the invention, capacitor 57 was sized to match the pulse width of the signal applied to transistor 61 such that, when transistor 61 was not conducting, capacitor 57 provided sufficient current to keep the LEDs luminous. For example, if the pulses into the base of transistor 61 had a frequency of 500 Hz and a duty cycle of 25%, then transistor 61 is off for a period of 1.5 milliseconds (mS). The current through an LED is typically 10 ma. (milliamperes) and the forward voltage drop is 1.8 volts. If four LEDs are in series then the voltage at the end of 1.5 mS must be greater than 7.2 volts plus the voltage drop across resistor 56. It is assumed that the average current over the 1.5 mS period is 10 ma. If resistor 56 has a resistance of 1 k$\Omega$, then the average voltage on capacitor 57 is equal to (4×1.8+1000×0.01)=(7.2+10)=17.2 volts. It can be shown that, for an initial voltage of 20 volts, capacitor 57 needs a capacitance of 0.27 $\mu$f to sustain the LEDs for a period of 1.5 mS. For shorter periods, a smaller capacitor can be used. When transistor 61 is conducting, current is supplied by inductor 52 to the LEDs and to capacitor 57 and an EL lamp coupled to inverter 51 dims. It is preferred to have the duty cycle of the signal to transistor 61 less than 50% to minimize dimming.

FIG. 5 is a schematic of an alternative embodiment of the invention in which the LEDs are coupled to a current source. Specifically, inverter 51 has an output pin, pin 7, for an external storage capacitor that is connected internally across the DC diagonal of a switching bridge. Capacitor 63 has one terminal coupled to pin 7 and a second terminal coupled through LEDs 71–74 to ground or common. LEDs 71 and 72 are connected in series, as are diodes 73 and 74. The pairs are then oppositely poled and coupled in parallel between capacitor 63 and ground. This embodiment has the advantage of using capacitor 63 as a ballast and avoids the inefficiency of a series resistor.

Inverter 51 provides a series of high frequency pulses to charge capacitor 63. These pulses are conducted through LEDs 73 and 74 when capacitor 63 is charging. Between pulses, when capacitor 63 is discharging, current flows through LEDs 71 and 72. Transistors 76 and 77 provide a by-pass circuit for either, or both, of the charge and discharge cycles. FIG. 6 is a schematic of an alternative embodiment of the invention wherein inverter 80 produces alternating current without using a switching bridge. In this embodiment, the voltage across pump inductor 81 is sampled to provide voltage for LEDs 84 and 85. Current is limited by resistor 85. LEDs 84 and 85 are oppositely poled to provide a load on both half cycles of the alternating current through an EL lamp (not shown) coupled between pins 1 and 3.

FIG. 7 is a variation of FIG. 6 in which the LEDs are returned to supply or ground, in effect connected in series across inductor 81. LEDs 83 and 84 conduct on alternate half cycles of the current through inductor 81. LED 83 conducts when pin 2 of inverter 80 is more than a few volts above supply voltage. Similarly, LED 84 conducts when pin 4 of inverter 80 is more than a few volts negative. A slight disadvantage of this circuit is the second ballast resistor, which marginally increases the cost of the circuit.

Figure 8:
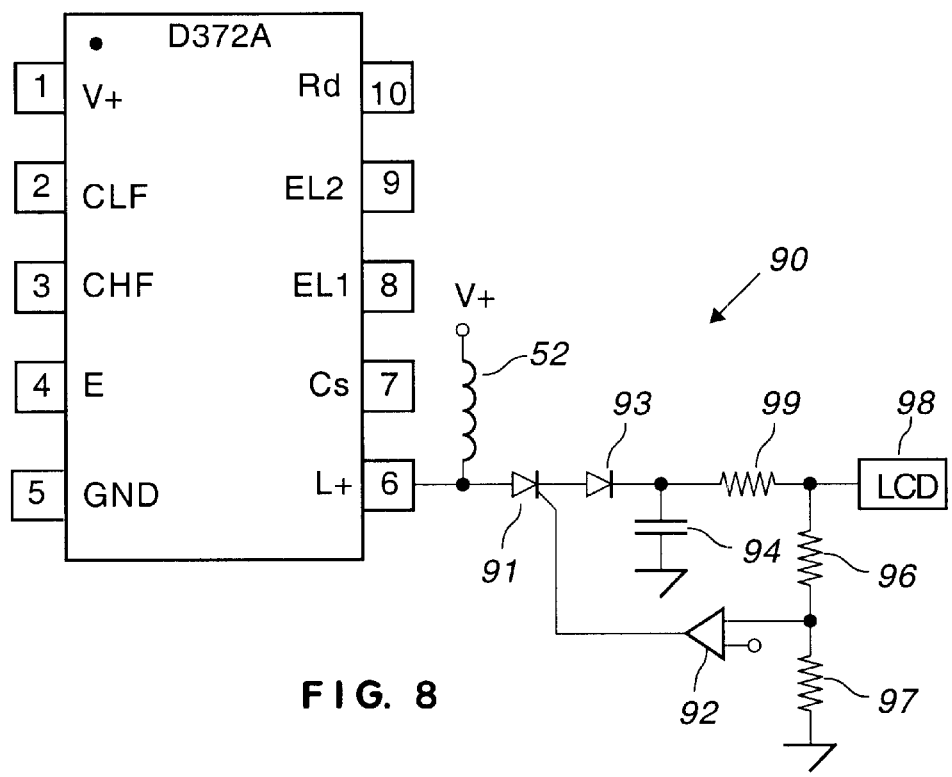
FIG. 8 is a schematic of a preferred embodiment of a bias source for an LCD.

FIG. 8 is a schematic of a preferred embodiment of a bias source for a liquid crystal display. Source 90 includes a voltage tap and a voltage regulator to reduce ripple. The anode of SCR 91 is coupled to the output end of inductor 52, the gate of the SCR is coupled to comparator 92, and the cathode of the SCR is coupled through diode 93 to capacitor 94. When SCR 91 is conducting, pulses from inductor 52 charge capacitor 93. The voltage on capacitor 94 is sampled by a voltage divider including series resistors 96 and 97 and the reduced voltage is coupled to one input of comparator 92. The voltage divider, comparator, and SCR provide a simple regulator for controlling the bias voltage applied to LCD 98. Capacitor 94 and resistor 99 are a low frequency filter.

Figure 9:
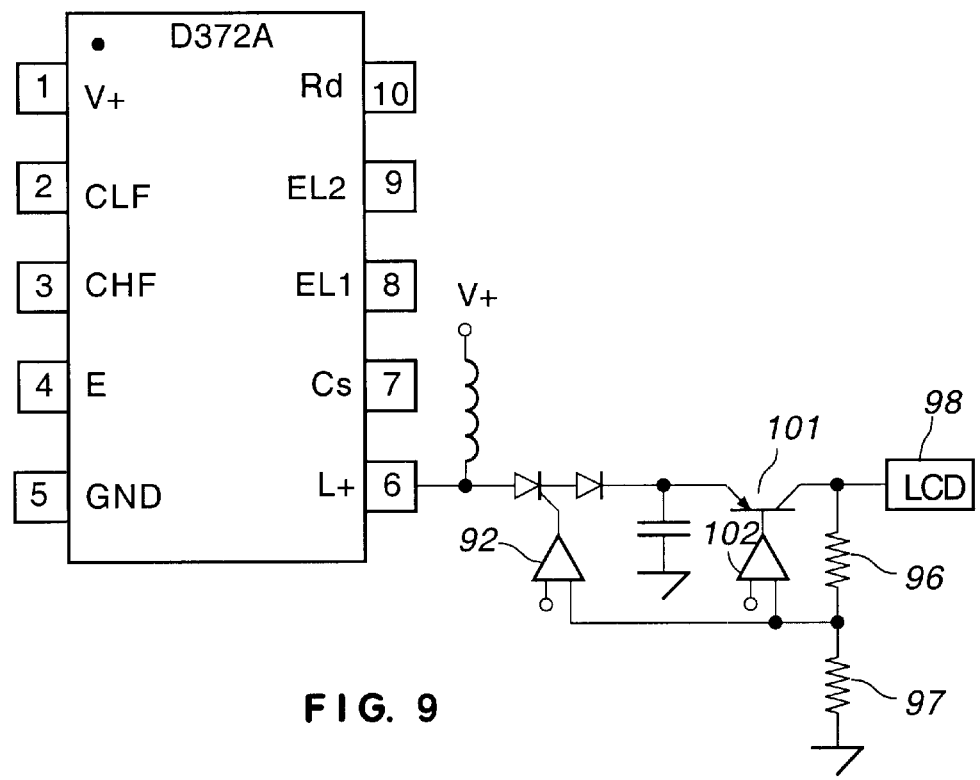
FIG. 9 is a schematic of an alternative embodiment of a bias source for an LCD.

FIG. 9 is a schematic of an alternative embodiment of the invention in which a transistor is substituted for resistor 99 (FIG. 8). Transistor 101 is controlled by comparator 102, which has one input coupled to the junction of resistors 96 and 97 and the other input coupled to a reference voltage. The reference signals coupled to comparators 92 and 102 need not have the same voltage. Transistor 101 provides additional smoothing of the bias signal to LCD 98.

The invention thus provides an inverter for driving LCDs, LEDs, and EL lamps by adapting an existing, commercially available inverter. The inverter can have either an H-bridge (floating EL lamp) or a non-floating output for an EL lamp.

Having thus described the invention, it will be apparent to those of skill in the art that various modifications can be made within the scope of the invention. For example, the LEDs can be arranged in any configuration including combination of serial and parallel. A series circuit is preferred to minimize current. In FIG. 4, diode 55, resistor 56, and capacitor 57 are optional but improve performance if included. A circuit was built and operated successfully without these devices, although the LEDs were slightly dimmer than when the devices are included. Although illustrated in conjunction with commercially available inverters, the invention is preferably implemented in a single integrated circuit with few external components. Only a single bias source is illustrated but it is understood that two bias sources would be used to provide positive bias and negative bias or high bias and low bias, depending upon whether or not a split power supply was used for the liquid crystal display.

The invention claimed is:

1. An inverter for simultaneously driving at least one EL lamp and at least one LED, said inverter comprising:
    an inductor for producing a high voltage suitable for driving said EL lamp;
    said EL lamp coupled to said inductor; and
    said at least one LED also coupled to said inductor.

2. The inverter as set forth in claim 1 and further including a resistor coupled in series between said inductor and said at least one LED.

3. The inverter as set forth in claim 2 and further including a diode in series with said resistor and having a junction there between.

4. The inverter as set forth in claim 1 wherein said LED is returned to supply.

5. The inverter as set forth in claim 1 wherein said LED is returned to common.

6. The inverter as set forth in claim 1 including a pair of oppositely poled LEDs coupled in series with said resistor, wherein said resistor and said LEDs are in parallel with said inductor.

7. The inverter as set forth in claim 1 and further including a bias source coupled to said inductor for providing a bias voltage suitable for an LCD.

8. The inverter as set forth in claim 7 wherein said bias source includes a voltage tap coupled to said inductor and a voltage regulator coupled to said tap.

9. An inverter for driving at least one EL lamp and at least one LED, said inverter comprising:
    an inductor for producing a high voltage suitable for driving said EL lamp;
    said at least one LED coupled to said inductor;
    a resistor coupled in series between said inductor and said at least one LED; and
    a diode in series with said resistor and having a junction there between;
    wherein said diode is coupled to said inductor and said resistor and further including a capacitor coupled in parallel with said resistor and said at least one LED.

10. The inverter as set forth in claim 9 and further including a transistor in series with said at least one LED.

* * * * *